United States Patent
Yu

(10) Patent No.: US 11,670,102 B2
(45) Date of Patent: Jun. 6, 2023

(54) EFFICIENT BOUNDING BOX MERGING

(71) Applicant: PayPal, Inc., San Jose, CA (US)

(72) Inventor: Xiaodong Yu, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/465,281

(22) Filed: Sep. 2, 2021

(65) Prior Publication Data

US 2023/0060875 A1    Mar. 2, 2023

(51) Int. Cl.
  *G06V 30/224*    (2022.01)
  *G06V 30/40*    (2022.01)

(52) U.S. Cl.
  CPC ............ *G06V 30/224* (2022.01); *G06V 30/40* (2022.01); *G06V 30/43* (2022.01)

(58) Field of Classification Search
  CPC ....... G06V 30/224; G06V 30/40; G06V 30/43
  See application file for complete search history.

(56) References Cited

U.S. PATENT DOCUMENTS

| | | | |
|---|---|---|---|
| 10,706,322 B1* | 7/2020 | Yang | G06V 30/414 |
| 2011/0222771 A1* | 9/2011 | Cimpoi | G06V 10/245 |
| | | | 382/176 |
| 2021/0027872 A1* | 1/2021 | Hirakawa | G16H 15/00 |

* cited by examiner

*Primary Examiner* — King Y Poon
*Assistant Examiner* — Michael L Burleson
(74) *Attorney, Agent, or Firm* — Greenberg Traurig, LLP

(57) ABSTRACT

A system can merge text bounding boxes such as Optical Character Recognition (OCR) bounding boxes. A document can comprise a plurality of the text bounding boxes. Distance thresholds between text bounding boxes can be utilized for comparison against a distance threshold. Distance thresholds can vary depending on context information associated with the document. In response to a determination that text bounding boxes satisfy the distance threshold, the text bounding boxes can be assigned to a bounding box group.

20 Claims, 10 Drawing Sheets

EFFICIENT BOUNDING BOX MERGING

TECHNICAL FIELD

The disclosed subject matter generally relates to optical character recognition, and more particularly to efficient text bounding box merging.

BACKGROUND

Optical character recognition (OCR) is used in countless industries, such as in banking and logistics industries. However, bounding boxes generated using such OCR often fail to meet particular needs of different organizations. This is because OCR software tends to be generic, requiring organizations to either perform additional manual processing of bounding boxes, or employ customized software in order to cater bounding boxes to local needs. For example, it can be desirable for bounding boxes to bound at the word-level. In other cases, it can be desirable for bounding boxes to bound an entire line or an entire paragraph. However, such manual processing or custom software for businesses to tailor OCR documents can be costly and time consuming.

DETAILED DESCRIPTION

Figure 1:
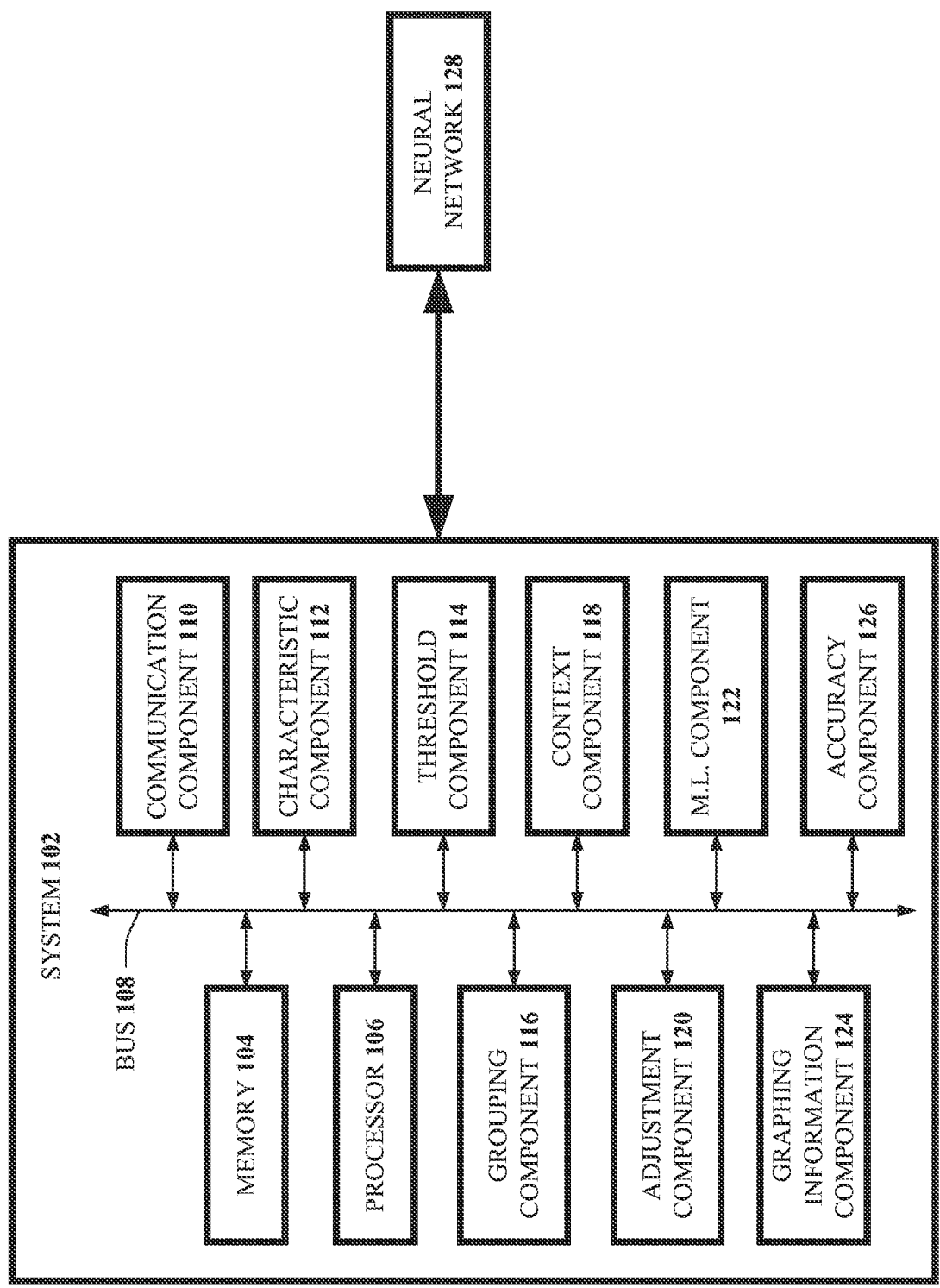
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

According to an embodiment, a system can comprise a processor and a non-transitory computer-readable medium having stored thereon computer-executable instructions that are executable by the system to cause the system to perform operations comprising accessing a document comprising a plurality of text bounding boxes, determining a characteristic of first text of a first bounding box of the plurality of text bounding boxes, determining a distance threshold based on the characteristic of the first text of the first bounding box, determining whether the first bounding box and a second bounding box of the plurality of text bounding boxes satisfy the distance threshold, in response to a determination that the first bounding box and the second bounding box satisfy the distance threshold, assigning the first bounding box and the second bounding box to a bounding box group, wherein the bounding box group replaces the first bounding box and the second bounding box, and wherein the bounding box group comprises the first text and second text of the second bounding box, determining context information associated with the document, and adjusting the distance threshold based on the context information, using a tuning model, wherein the tuning model has been generated based on machine learning applied to past context information representative of past contexts of other text in other documents other than the document.

In one or more embodiments, text herein can be identified using electronic optical character recognition (OCR). Further, the characteristic (e.g., a feature) can comprise a font size of the first text. Documents herein can comprise one or more of a variety of documents, such as proof of address documents (e.g., a bank statement), proof of identity documents (e.g., a passport), shipping labels, or other suitable documents. It is noted that, according to an example, text herein can be processed from left to right and top to bottom, though text can be processed in other directions (e.g., right to left). It is additionally noted that the bounding boxes herein can be sorted (e.g., left to right and top to bottom) so that every bounding box does not need to be compared to every other box (e.g., only compared to adjacent bounding boxes).

Documents described herein can be associated with various context information indicative of document context. In some embodiments, the context information can comprise an entity associated with the document, and the entity can be associated with an insignia identified in the document. For example, the document can comprise a symbol that is known or determined to be associated with the entity. In other embodiments, the context information can comprise environmental information associated with capturing of the document. For instance, such environmental information can comprise hardware information associated with a scanner or camera that captured the document, location information associated with the document and/or said scanner, lighting information associated with lighting during capture of the document, user profile information associated with a user of a scanning device, batching information associated with a document (e.g., large tax document being processed in batches), or other suitable environmental information. In this regard, context information herein can be associated with various context identifiers. Such context identifiers can comprise elements in a document that can be utilized to determine context information, and thus contexts, of a document herein. As alluded to above, contexts herein can be employed for modification (e.g., tuning) if distance thresholds herein (e.g., using a tuning model as later discussed in greater detail). For instance, a logo in a document can comprise a context identifier of a document. Such a logo can be indicative of an industry, business, environment, or other suitable contexts associated with documents herein. In another example, light reflection or refraction intensity can comprise a context identifier indicative one or more contexts. For instance, light reflection intensity can be indicative of document scan location (e.g., a dark room, a light room, outside, or other locations). Another context identifier can comprise a document paper type, texture, or size. According to an embodiment, certain paper types, textures, or sizes can be unique to a region in the world, or can be associated with a particular business or industry. Thus, such paper types, textures, or paper sizes can be indicative of a location of origin of said document. In additional examples, an Internal Revenue Service (IRS) logo can comprise context information indicative that a document comprises a tax document, and a Citi bank logo can comprise context information that a document comprises a banking document or credit card statement. It is noted that the distance threshold (e.g., gap threshold) herein can vary depending on the context information (e.g., using the machine learning to learn to adjust the distance threshold based on various context identifiers). In this regard, such distance thresholds can be modified from default distance thresholds based on context information identified on a document herein.

In various embodiments, the above operations can further comprise determining whether the bounding box group and a third bounding box of the plurality of text bounding boxes satisfy the distance threshold, and in response to a determination that the bounding box group and the third bounding box satisfy the distance threshold, assigning third text of the third bounding box into the bounding box group, wherein the bounding box group replaces the third bounding box. According to an example, after at least one bounding box pair exists, subsequent bounding boxes can continue to be checked until a distance threshold is not satisfied, which can indicate an end of the bounding box group. This can eliminate the need to compare distances from every bounding box to every other bounding box, thus increasing efficiency in bounding box merging herein.

It is noted that the plurality of text bounding boxes herein can comprise a row of text in the document, and bounding boxes of the plurality of text bounding boxes can be grouped according to distances between adjacent bounding boxes determined to be less than or equal to the distance threshold.

In various embodiments, the context information can comprise a plurality of context identifiers, and the plurality of context identifiers (and/or features) can be weighted according to importance criteria determined using machine learning applied to past context identifier information representative of past contexts of the other documents. For instance, various importance criteria can be defined or can be determined (e.g., using machine learning). For example, a logo can be determined to comprise highly important or relevant context information. In this regard, such a context identifier can be weighted heavily. Similarly, a paper type can be determined to be of low importance, and can thus be weighted lightly, relative to more important context identifiers.

In another embodiment, a computer-implemented method can comprise determining, by a computer system comprising a processor, context information associated with a document, wherein the context information is determined using machine learning applied to past context information representative of past contexts of other documents other than the document, determining, by the computer system, a feature (e.g., a characteristic) of first text of a first bounding box of a plurality of text bounding boxes in the document, determining, by the computer system, a distance threshold based on the context information and the feature, in response to a determination, by the computer system, that the first bounding box and a second bounding box of the plurality of text bounding boxes satisfy the distance threshold, generating, by the computer system, a bounding box group comprising the first bounding box and the second bounding box, determining, by the computer system, accuracy information associated with the bounding box group and representative of an accuracy of the generation of the bounding box group, and modifying, by the computer system, the distance threshold based on the accuracy information. It is noted that distance thresholds herein can comprise horizontal or vertical distance thresholds between adjacent bounding boxes. In this regard, distances between adjacent bounding boxes not larger than a distance threshold can satisfy the threshold, while distances between adjacent boxes larger than the distance threshold do not satisfy the distance threshold.

In one or more embodiments, feature herein can be a font size, and the font size of the first text of the first bounding box can be determined, by the computer system, based on a length, a width, and a height of the first bounding box. For instance, width can be divided by height in order to determine font size. In other embodiments, such features can comprise one or more binary features, such as date, zip code, city, county, state, country, or other features such as object edges, alphabetic characters, alphanumeric characters, numeric features, real numbers, or currency, among others, which can be utilized in order to determine or modify a distance threshold herein.

It is noted that distance thresholds herein can comprise a horizontal distance thresholds. In this regard, the above method can further comprise determining, by the computer system, whether the bounding box group and a third bounding box of the plurality of text bounding boxes satisfy a vertical distance threshold (which can be the same distance as the horizontal threshold or a different distance from the horizontal distance threshold), and in response to a determination, by the computer system, that the bounding box group and the third bounding box satisfy the vertical distance threshold, assigning, by the computer system, the third bounding box to the bounding box group, wherein the bounding box group comprises the first text, second text of the second bounding box, and third text of the third bounding box.

In various embodiments, the plurality of text bounding boxes can comprise text in the document, and bounding boxes of the plurality of text bounding boxes can be grouped, by the computer system, according to distances between adjacent bounding boxes determined, by the computer system, to be less than or equal to at least one of the horizontal distance threshold and/or the vertical distance threshold. In this regard, distances between adjacent bounding boxes (e.g., above, below, or to a side) can be determined and compared to a horizontal distance threshold and/or the vertical distance threshold.

In various embodiments, the above method can further comprise determining, by the computer system, graphing information comprising relative position information (e.g., distances between bounding box edges, objects, logos, etc.) associated with the plurality of text bounding boxes, wherein the context information is further determined, by the computer system, using a neural network based on the graphing information. It is noted that the distance threshold can comprise a dynamic distance threshold adjusted, by the computer system, using the neural network and based on the context information. Such graphing information can be utilized, for instance, in order to determine features or context identifiers in a document. In this regard, the graphing information can be employed to determine a document (e.g., of a business or one or many documents that a business utilizes, which can comprise defined distance thresholds). Thus, distance thresholds can consequently be modified as discussed herein (e.g., based on the graphing information and/or context information).

In yet another embodiment, a computer-program product for facilitating bounding box merging can comprise a computer-readable medium having program instructions embedded therewith, the program instructions executable by a computer system to cause the computer system to perform operations comprising determining context information representative of a context of a document comprising a plurality of text bounding boxes, determining a gap threshold (e.g., a distance threshold) based on the context information and a font size of first text of a first bounding box of the plurality of text bounding boxes, determining whether the first bounding box and a second bounding box of the plurality of text bounding boxes satisfy the gap threshold, and in response to a determination that the first bounding box and the second bounding box satisfy the gap threshold, assigning the first bounding box and the second bounding box to a bounding box group, wherein the bounding box group replaces the first bounding box and the second bounding box, and wherein the bounding box group comprises the first text and second text of the second bounding box. In this regard, text of adjacent bounding boxes can be replaced with a collective bounding box that comprises a combination of text (e.g., first text and second text) from a first bounding box and a second bounding box, adjacent to the first bounding box.

In various embodiments, the gap threshold can be further based on a logo identified in the document. For instance, a banking logo can represent a banking document and be associated with a particular gap threshold. For example, IRS logo can be associated with a tax document. In other embodiments, a QR code in a document can be scanned and additional context information, threshold information, or other suitable information can be gathered from information associated with the QR code. Such information can be, for instance, weighted more heavily. For example, identifying a FedEx logo on a shipping label or a QR code on a document can be highly influential in determining distance thresholds (e.g., distance thresholds herein can be industry or business specific). In this regard, such influence can represent a high relative level of importance which can result in a heavier relative weight for use in determination, and/or modification/adjustment/tuning of a distance (e.g., gap) threshold herein. In additional embodiments, such a QR code can be indicative of a defined bounding box threshold associated with a document on which the QR code is printed or otherwise presented.

It is noted that, in some embodiments, the font size can be a first font size. In this regard, the above operations can further comprise in response to assigning the first bounding box and the second bounding box to the bounding box group, updating the gap threshold to a minimum of the first font size of the first text of the first bounding box, and a second font size of the second text of the second bounding box. In this regard, the smaller of font sizes of adjacent bounding boxes can be employed for determining an updated gap threshold for use in determining whether the bounding box group should be merged with additional bounding boxes and/or other bounding box groups.

In an additional embodiment, the above operations can further comprise receiving accuracy information representative of grouping accuracies associated with the bounding box group, and in response to receiving the accuracy information, modifying the gap threshold (e.g., distance threshold) based on the accuracy information. In this regard, a neural network can be employed in order to determine such accuracy information, which can be utilized in order to modify gap thresholds based on historical accuracies associated with various historical gap thresholds. For instance, machine learning or neural networks herein can be employed to analyze historical (e.g., previously analyzed) documents and associated contexts in order to determine correlations between contexts and such historical documents. In this regard, various contextual information can be determined to be associated with various respective distance thresholds (e.g., rather than a default distance threshold).

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool (e.g., any suitable combination of computer-executable hardware and/or computer-executable software) which can be configured to perform various operations relating to bounding box merging. The system 102 can comprise one or more of a variety of components, such as memory 104, processor 106, bus 108, communication component 110, characteristic component 112, threshold component 114 grouping component 116, context component 118, adjustment component 120, ML component 122, graphing information component 124, accuracy component 126, and/or neural network 128.

In various embodiments, one or more of the memory 104, processor 106, bus 108, communication component 110, characteristic component 112, threshold component 114, grouping component 116, context component 118, adjustment component 120, ML component 122, graphing information component 124, accuracy component 126, and/or neural network 128 can be communicatively or operably coupled (e.g., over a bus or wireless network) to one another to perform one or more functions of the system 102.

According to an embodiment, the communication component 110 can access (e.g., from a document data store or another suitable data store or database) a document comprising a plurality of text bounding boxes (e.g., one or more of text bounding boxes 802, 804, and/or 806). It is noted that the plurality of texting bounding boxes can comprise text (e.g., letters, numbers, symbols, or other suitable text) in the document. In this regard, text from the plurality of text bounding boxes can be identified using electronic OCR.

It can be appreciated that the communication component 110 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the characteristic component 112 can determine a characteristic (e.g., a feature such as a font size) of first text of a first bounding box of the plurality of text bounding boxes. It is noted that the characteristic (e.g., feature) can comprise a font size of the first text. In various embodiments, font size of the first text of the first bounding box can be determined based on a length, a width, and a height of the first bounding box. For instance, text width can be divided by the length of word in order to determine a font size (e.g., by the characteristic component 112). In this regard, for example, the characteristic component 112 can determine a font size of the numbers contained in bounding box 802 (e.g., using width, height, length). The characteristic component 112 can likewise determine a font size of a second bounding box (e.g., bounding box 804) and/or third bounding box (e.g., bounding box 806), and so on. In this regard, any number of bounding boxes herein can be evaluated. It is noted that features (e.g., characteristics) herein can comprise font size, one or more binary features, such as date, zip code, city, county, state, country, or other features such as alphabetic characters, alphanumeric characters, numeric features, real numbers, or currency, among others.

According to an embodiment, the threshold component 114 can determine a distance threshold (e.g., a gap threshold) based on the characteristic (e.g., a feature) of the first text of the first bounding box (e.g., bounding box 802). For instance, a feature (e.g., a font size) can correspond to a default distance threshold. In this regard, a distance threshold between bounding boxes 802 and 804 can be based on a minimum of the text sizes of bounding boxes 802 and 804 (in document 800, text sizes of bounding boxes 802 and 804 are the same, though bounding boxes 802, 804, and so on, can comprise text of varying sizes). The threshold component 114 can additionally determine whether the first bounding box (e.g., bounding box 802) and second bounding box (e.g., bounding box 804) of a plurality of text bounding boxes (e.g., 802-806, among others) satisfy a distance threshold, e.g., by comparing gap distances between adjacent bounding boxes to the distance threshold. In one or more embodiments, distance thresholds herein can vary depending on location within a document (e.g., document 800). For instance, the top 25% of a document can comprise a first distance threshold, the middle 50% of a document can comprise second distance threshold, different from the first distance threshold, and the bottom 25% of the document can comprise a third distance threshold, different from the first and/or second distance threshold. In one or more embodiments, such locations can be determined, for instance, using machine learning (e.g., using the ML component 122) applied to past location information representative of past locations of other documents other than the document.

It is noted that the plurality of texting bounding boxes can comprise a row of text in a document (e.g., document 800), and that the bounding boxes of the plurality of text bounding boxes can be grouped (e.g., by the grouping component 116) according to distances between adjacent bounding boxes determined to be less than or equal to the distance threshold (and/or a vertical distance threshold described herein). Further, bounding boxes of the plurality of text bounding boxes can be grouped (e.g., by the grouping component 116) according to distances between the adjacent bounding boxes determined to be less than or equal to both of at the horizontal distance threshold and/or a vertical distance threshold.

According to an embodiment, the grouping component 116 can, in response to a determination that the first bounding box (e.g., bounding box 802) and the second bounding box (e.g., bounding box 804) satisfy the distance threshold, assign the first bounding box and the second bounding box to a bounding box group (e.g., bounding box group 808). In other embodiments, the grouping component 116 can generate the bounding box group (e.g., bounding box group 808). It is noted that the bounding box group 808 can replace the first bounding box 802 and the second bounding box 804, and that the bounding box group 808 can comprise the first text of the first bounding box and second text of the second bounding box. In this regard, the bounding box group 808 can replace the first bounding box 802 and the second bounding box 804.

In various embodiments, the threshold component 114 can determine whether the bounding box group (e.g., bounding box group 808) and a third bounding box (e.g., bounding box 806) of the plurality of text bounding boxes satisfy the distance threshold. In this regard, the grouping component 116 can, in response to a determination (e.g., by the threshold component 114) that the bounding box group (e.g., bounding box group 808) and the third bounding box 806 satisfy the distance threshold, assign third text of the third bounding box into the bounding box group 808, in which the bounding box group 808 replaces the third bounding box 806.

Figure 8:
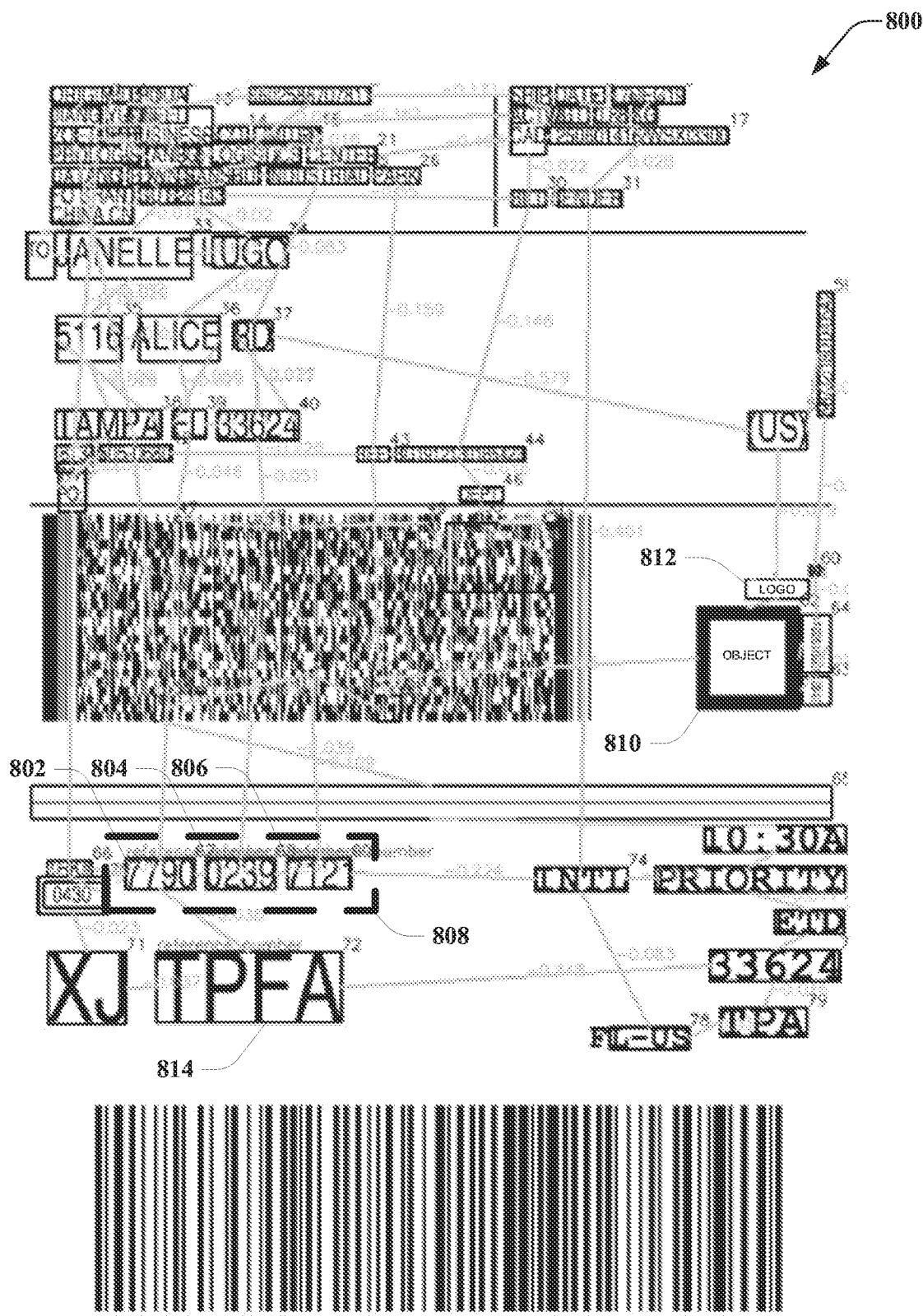
FIG. 8 illustrates an exemplary document in accordance with one or more embodiments described herein.

In some embodiments, the distance threshold herein can comprise a horizontal distance threshold. In this regard, the threshold component 114 can additionally/alternatively determine whether the bounding box group and a third bounding box (e.g., bounding box 814) of the plurality of text bounding boxes satisfy a vertical distance threshold (e.g., different from the horizontal distance threshold herein or similar to the horizontal distance threshold herein). Further in this regard, the grouping component 116 can, in response to a determination (e.g., by the threshold component 114) that the bounding box group (e.g., bounding box group 808) and the third bounding box (e.g., bounding box 814) satisfy the vertical distance threshold, assign the third bounding box to the bounding box group 808, in which the bounding box group comprises the first text, second text of the second bounding box, and third text of the third bounding box. In FIG. 8, however, a vertical distance threshold between the bounding box group 808 and the third bounding box 814 can be determined not to satisfy the vertical distance threshold.

According to an embodiment, the context component 118 can determine context information associated with the document. Context information herein can comprise one or more of a variety of contexts. For instance, context information herein can comprise an entity (e.g., a business or an organization) associated with the document. For example, the document 800 can be determined, using context information, to comprise a FedEx shipping label. In this regard, the entity (e.g., FedEx) can be associated with an insignia (e.g., a FedEx object or a logo) recognized in the document (e.g., by the characteristic component 112 and/or context component 118). In various embodiments, distance thresholds herein can be further based on an insignia (e.g., object 810 or logo 812) identified in the document 800 (e.g., by the context component 118 and/or characteristic component 112).

In other embodiments, the context information can comprise environmental information, associated with capturing of the document. For instance, such environmental information can comprise hardware information associated with a scanner or camera that captured the document, location information associated with the document and/or said scanner, lighting information associated with lighting during capture of the document, user profile information associated with a user of a scanning device, batching information associated with a document (e.g., large tax document being processed in batches), or other suitable environmental information. In additional embodiments, context information can comprise document type, such as a banking document, logistics document, or other suitable document types. Further, said context information can comprise batching information associated with the document.

It is noted that, when the context information comprises a plurality of context identifiers, the plurality of context identifiers can be weighted according to importance criteria determined, for instance, using machine learning (using the ML component 122) applied to past context identifier information (e.g., context information) representative of past contexts of the other documents. For instance, machine learning (e.g., using ML component 122) or neural networks herein (e.g., neural network 128) can be employed to analyze historical (e.g., previously analyzed) documents and associated contexts in order to determine correlations between contexts and such historical documents. In this regard, various contextual information can be determined to be associated with various respective distance thresholds (e.g., rather than a default distance threshold). Similarly, features can be weighted according to importance criteria determined, for instance, using machine learning (e.g., using the ML component 122) applied to past features in other documents.

According to an embodiment, the adjustment component 120 can adjust the distance threshold based on the context information, for instance, using a tuning model, wherein the tuning model has been generated based on machine learning (e.g., using the ML component 122) applied to past context information representative of past contexts of other text in other documents other than the document. In this regard, such a tuning model can leverage one or more suitable machine learning techniques (e.g., Bayesian optimization) in order to adjust (e.g., tune) distance thresholds herein. The foregoing can increase distance threshold accuracies, thereby increasing bounding box merging accuracies. In this regard, past context information and associated past distance thresholds in other documents already subjected to bounding box merging can be utilized for generation of such a tuning model, which can thereby be employed for bounding box merging distance threshold improvement. For instance, weights associated with various contexts can be determined based on relative influence on bounding box thresholds herein, which can be applied to future bounding box distance threshold determination.

In other embodiments, the accuracy component 126 can determine, accuracy information associated with the bounding box group (e.g., bounding box group 808) and representative of an accuracy of the generation of the bounding box group 808. In this regard, the adjustment component 120 can modify the distance threshold based on the accuracy information. Accuracy information can be determined, for instance, by the accuracy component 126, using one or more validation techniques, such as resubstitution, hold-out, K-fold cross-validation, Leave-One-Out Cross-Validation (LOOCV), random subsampling, bootstrapping, or other suitable validation techniques.

In another embodiment, the communication component 110 can receive accuracy information representative of grouping accuracies associated with a bounding box group. In this regard, in response to receiving the accuracy information (e.g., via the communication component 110), the adjustment component 120 can modify the gap threshold or distance threshold based on the accuracy information. The foregoing can comprise a feedback process for improving bounding box merging herein.

According to an embodiment, in response to the grouping component 116 assigning a first bounding box to a bounding box group, the adjustment component 120 update a distance threshold or gap threshold herein to a minimum of the first font size of the first text of the first bounding box, and a second font size of the second text of the second bounding box.

According to an embodiment, the graphing information component 124 can determine graphing information comprising relative position information associated with the plurality of text bounding boxes. It is noted that said graphing can be based on, for instance, locations of edges or corners of the text bounding boxes. In this regard, the context information can be further determined using the context component 118 and/or ML component 122 based on the graphing information. According to an embodiment, the graphing information component 124 can generate a node attributed graph (e.g., based on extracted features/characteristics). In this regard, a deep graph library (DGL) framework can be utilized (e.g., with batch graph capabilities in order to train, validate, and/or test a dataset associated with the node attributed graph. In various embodiments, Graph-SAGE can be utilized with a mean aggregator for use in the node attributed graph model herein.

According to one or more embodiments, context information herein can be further determined (e.g., using a neural network 128) based on the graphing information (e.g., as determined by the graphing information component 124). Such graphing information can comprise relative position information associated with the plurality of text bounding boxes. In this regard, context information can be further determined (e.g., using a neural network 128) based on the graphing information. According to another embodiment, distance thresholds herein can comprise comprises dynamic distance thresholds which can be adjusted, for instance, using the neural network 128 and based on the context information (e.g., as determined by the context component 118). In this regard, the neural network 128 can be utilized in order to provide a feedback loop to the tuning model described herein. For example, a Bayesian network can be utilized for interference generation (e.g., by the ML component 122 and/or neural network 128). In this regard, some numbers can be more important than others, and the cost of making a mistake can be determined to be more or less detrimental, depending on the type of document (e.g., cost of an error in a federal tax ID number can be very high, whereas the cost of an error in a journal entry can be lower).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or ML components (e.g., ML component 122)

herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 122 can comprise an AI and/or ML model that can be trained (e.g., via supervised and/or unsupervised techniques) to perform the above or below-described functions using historical training data comprising various context conditions that correspond to various management operations. In this example, such an AI and/or ML model can further learn (e.g., via supervised and/or unsupervised techniques) to perform the above or below-described functions using training data comprising feedback data, where such feedback data can be collected and/or stored (e.g., in memory) by an ML component 122. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, an ML component 122 herein can initiate an operation associated with bounding box merging. In another example, based on learning to perform such functions described above using feedback data, an ML component 122 herein can initiate an operation associated with updating a model (e.g., a tuning model herein).

In an embodiment, the ML component 122 can perform a utility-based analysis that factors cost of initiating the above-described operations versus benefit. In this embodiment, an artificial intelligence component can use one or more additional context conditions to determine an appropriate distance threshold or context information, or to determine an update for a tuning model.

To facilitate the above-described functions, an ML component herein can perform classifications, correlations, inferences, and/or expressions associated with principles of artificial intelligence. For instance, an ML component 122 can employ an automatic classification system and/or an automatic classification. In one example, the ML component 122 can employ a probabilistic and/or statistical-based analysis (e.g., factoring into the analysis utilities and costs) to learn and/or generate inferences. The ML component 122 can employ any suitable machine-learning based techniques, statistical-based techniques and/or probabilistic-based techniques. For example, the ML component 122 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 122 can perform a set of machine-learning computations. For instance, the ML component 122 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
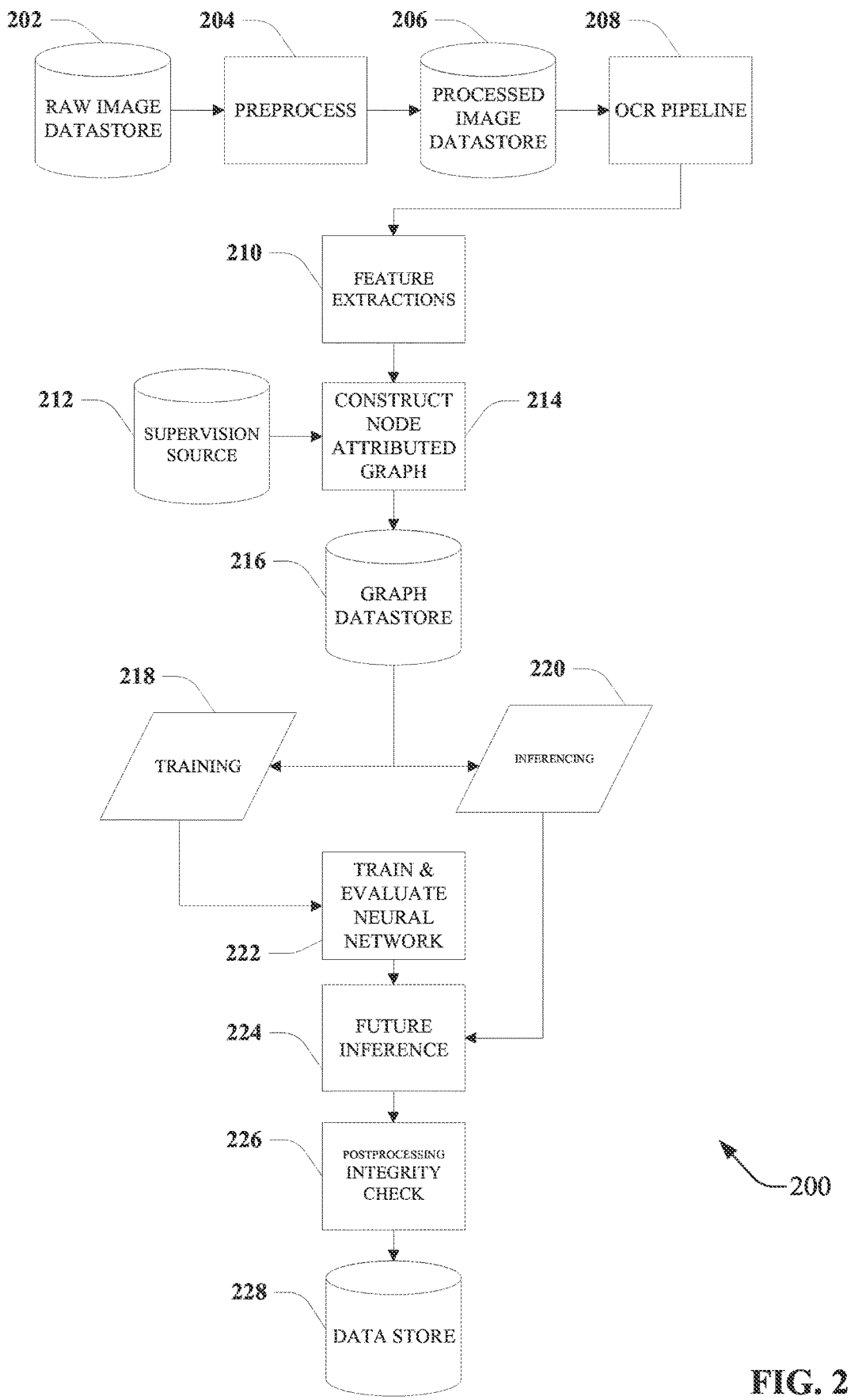
FIG. 2 is a flowchart of exemplary bounding box merging in accordance with one or more embodiments described herein.

Turning now to FIG. 2, there is illustrated a flowchart of a process 200 for bounding box merging in accordance with one or more embodiments herein. At 202, raw image(s) can be stored in a raw image datastore. It is noted that the raw images can be scans of a document (e.g., comprising text). At 204, the raw image(s) can be preprocessed (e.g., using the raw images retrieved from raw image datastore 202). In this regard, preprocessing of the can comprise rotating the images, de-skewing the images, or subjecting the images to other suitable preprocessing techniques. The preprocessed images can then be stored in a processed image datastore at 206. At 208, the preprocessed images can next be input into an OCR pipeline. In this regard, OCR on the images/documents can be performed (e.g., as would be understood by one of ordinary skill in the art). Subsequently, initial bounding boxes can be generated. For example, initial bounding boxes can surround each individual word or number.

At 210, features can be extracted and/or determined from the images. According to an example, such a feature (e.g., characteristic) can comprise, for instance, font size. In various embodiments, font size herein can be determined based on a height and width of respective text. For instance, width can be divided by height in order to determine font size. In other embodiments, such features can comprise binary features, such as date, zip code, city, county, state, country, alphabetic characters, alphanumeric characters, numeric features, real numbers, currency, or other features. Additionally, relative distances between neighboring bounding boxes can be determined. At 214, a node attributed graph can be constructed based on the feature extraction at 210 and/or from a supervision source stored at 212. In this regard, a DGL framework can be utilized (e.g., with batch graph capabilities in order to train, validate, and/or test a dataset associated with the node attributed graph. In various embodiments, GraphSAGE can be utilized with a mean aggregator for use in the node attributed graph model herein. At 216, the node attributed graph can be stored, for instance, in a graph datastore. At 218, the batched graph dataset can be stored (e.g., for use in model training) along with related data. At 220, the batched graph dataset can be stored (e.g., for use in inferencing) along with related data (e.g., associated metadata).

At 222, a convolutional neural network (e.g., neural network 128) herein can be trained and/or evaluated. In this regard, patterns in documents can be recognized (e.g., patterns of text, numbers, logos, objects, etc.) which can be utilized in order to determine and/or modify appropriate respective distance thresholds. In this regard, trained graph models can be generated. At 224, a future inference can be generated (e.g., using the trained neural network 128). The foregoing can predict, for instance, a tracking number (e.g., contained within bounding box group 808) of a shipping label (see, e.g., bounding box group 808 as later discussed) represented in document 800. At 226, a suitable postprocessing integrity check can occur. For example, a defined regular expression can be utilized in the postprocessing integrity checking. In this regard, entity integrity, referential integrity, domain integrity, user-defined integrity, and/or other suitable integrity types can be determined. At 228, final results of the postprocessing integrity check can be stored, for instance, in a suitable data store.

Figure 3:
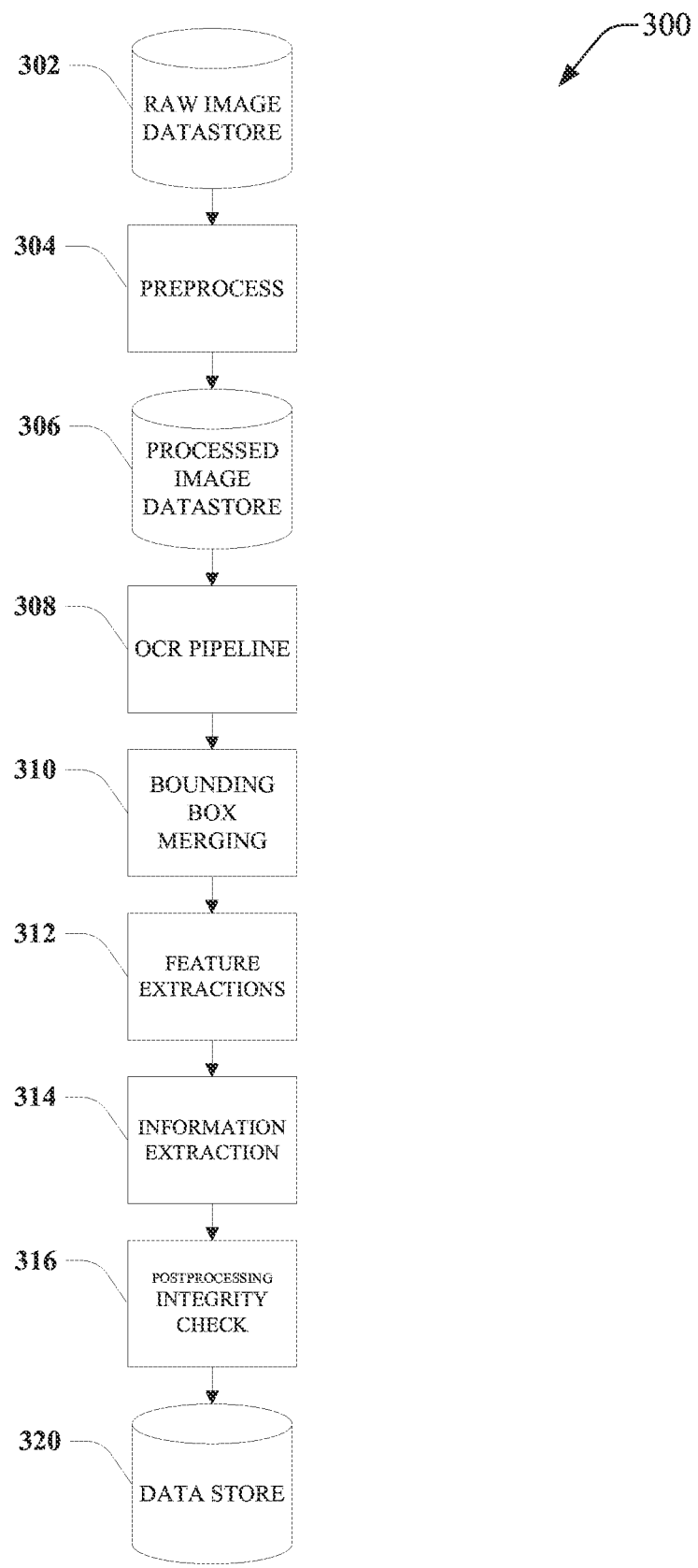
FIG. 3 is a flowchart of exemplary bounding box merging in accordance with one or more embodiments described herein.

With reference to FIG. 3, there is illustrated a flowchart of a process 300 for bounding box merging in accordance with one or more embodiments herein. At 302, raw image(s) can be stored in a raw image datastore. At 304, preprocessing can occur (see, e.g., step 204 above). At 306, the preprocessed images can be stored in a processed image datastore. At 308, the preprocessed images can be input into an OCR pipeline, which can output text with bounding boxes using electronic OCR. At 310, bounding box merging as described herein can occur (e.g., as facilitated by a system 102). In this regard, distances between adjacent bounding boxes can be compared to distance threshold(s) in order to determine whether to merge adjacent bounding boxes (e.g., bounding boxes 802, 804, 806) into one or more bounding box groups (e.g., bounding box group 808). At 312, feature extraction can occur (see, e.g., step 210 as discussed above). Further, feature vectors can be generated per bounding box. In this regard, nearest neighbor classification, neural networks, or statistical techniques such as Bayesian approaches can be employed to form classifications from such feature vectors. At 314, information extraction can occur, yielding extracted information. For instance, an entire address from merged address bounding boxes can be extracted. Similarly, a full tracking number can be extracted from a merged tracking-number bounding boxes (e.g., bounding box group 808 in document 800). Other examples can include name extraction, telephone number extraction, email address extraction, IP address extraction, mathematical information (e.g., equations), scientific information (e.g., formulas), or any other suitable or relevant information. It is noted that any information can be extracted from a document (e.g., document 800). Such information extraction can be according to a defined information extraction function or can be determined, for instance, using machine learning herein. At 316, a postprocessing integrity check can occur (e.g., on the extracted information) (see, e.g., step 226). At 320, results of the postprocessing integrity check can be stored in a suitable data store.

Figure 4:
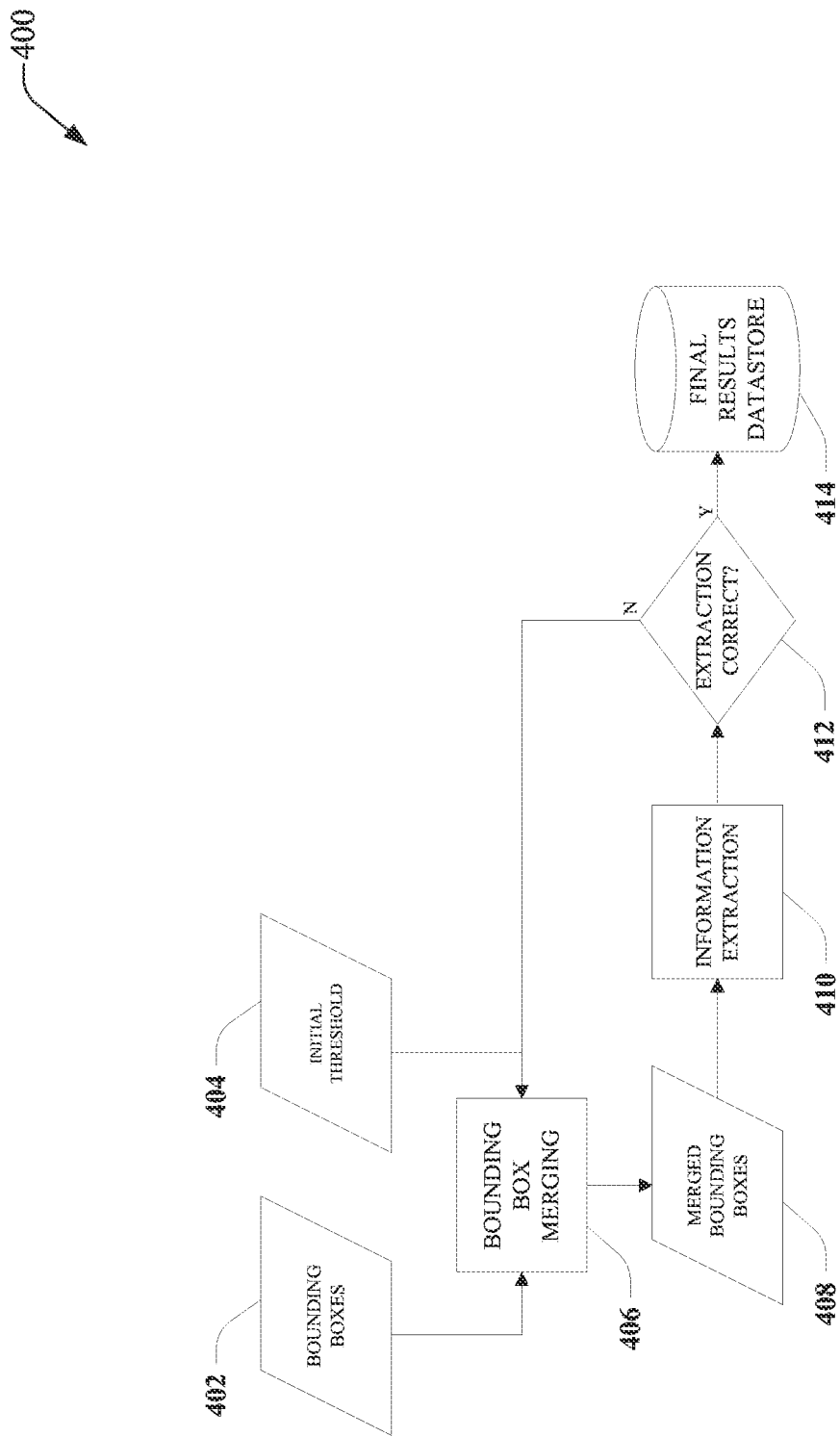
FIG. 4 is a flowchart of exemplary information extraction in accordance with one or more embodiments described herein.

FIG. 4 illustrates a flowchart of exemplary information extraction in accordance with one or more embodiments described herein. At 406, text with bounding boxes from 402 can be merged at 406 using, for instance, an initial or default threshold from 404. In this regard, the initial threshold can comprise a defined threshold basepoint, or an updated initial threshold generated, for instance, using a tuning model herein. The foregoing can yield merged bounding boxes at 408. At 410, information can be extracted from a document. For instance, an entire address from merged address bounding boxes can be extracted. Similarly, a full tracking number can be extracted from a merged tracking-number bounding boxes (e.g., bounding box group 808 in document 800). As previously discussed, such information extraction can be according to a defined information extraction function or can be determined, for instance, using machine learning herein. It is noted that a confidence score can be generated to accompany the extracted information. In this regard, a level of confidence associated with accuracy of such information extraction can be generated. Such confidence level information can accompany extracted information so that a level of caution with respect to the extracted information can be ascertained. For example, a low level of confidence (e.g., 15%) can be indicative of a high likelihood that bounding box merging errors are contained. A high level of confidence (e.g., 95%) can be indicative of a low likelihood that bounding box merging errors are contained. At 412, if the information extraction is correct (e.g., as determined by an accuracy component 126 and/or neural network 128), the results can be stored at 414 in a final results datastore. If the extraction is incorrect, the process can return to 406 (e.g., with a different threshold).

Figure 5:
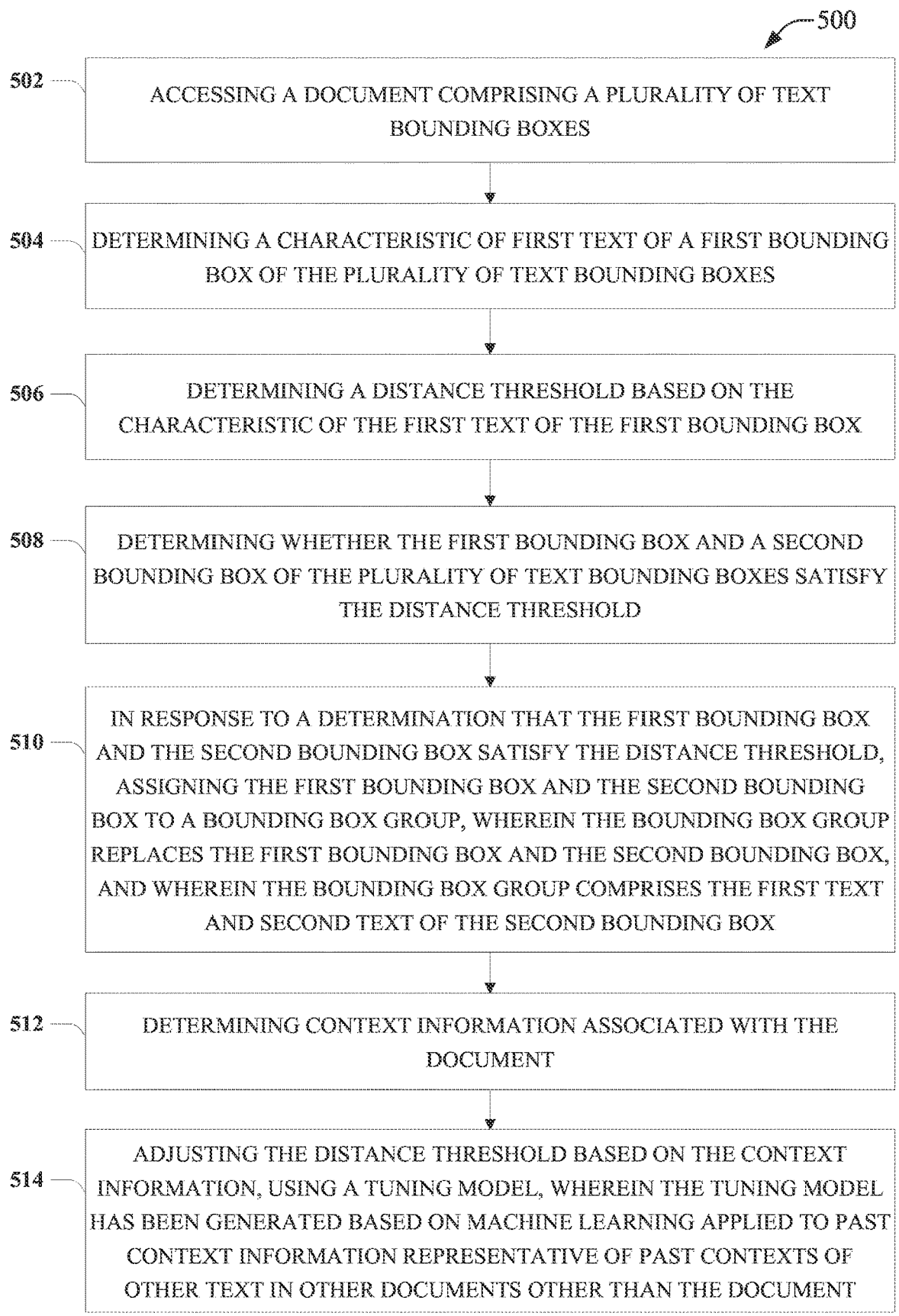
FIG. 5 is a block flow diagram for a process for bounding box merging in accordance with one or more embodiments described herein.

FIG. 5 illustrates a block flow diagram for a process 500 for bounding box merging in accordance with one or more embodiments described herein. At 502, the process 500 can comprise accessing (e.g., via communication component 110) a document (e.g., document 800) comprising a plurality of text bounding boxes (e.g., bounding boxes 802-808). In this regard, the communication component 110 can access said documents from a document data store or another suitable data store or database. At 504, the process 500 can comprise determining (e.g., using the characteristic component 112) a characteristic (e.g., a feature) of first text of a first bounding box (e.g., bounding box 802) of the plurality of text bounding boxes (e.g., bounding boxes 802-806). For instance, a such a characteristic or feature can comprise text size (e.g., of text within the bounding box 802) or another suitable feature as previously discussed.

At 506, the process 500 can comprise determining (e.g., using the threshold component 114) a distance threshold based on the characteristic of the first text of the first bounding box. In this regard, a text or font size can be associated with a default distance threshold among a variety of default distance thresholds for various text sizes. For instance, a distance threshold between bounding boxes 802 and 804 can be based on a minimum of the text sizes of bounding boxes 802 and 804. At 508, the process 500 can comprise determining (e.g., using the threshold component 114) whether the first bounding box (e.g., bounding box 802) and a second bounding box (e.g., bounding box 804) of the plurality of text bounding boxes satisfy the distance threshold. The foregoing can occur by comparing a length of a gap between adjacent bounding boxes (e.g., bounding boxes 802 and 804) to the distance threshold to determine whether the gap is less than or equal to the threshold.

At 510, the process 500 can comprise in response to a determination that the first bounding box (e.g., bounding box 802) and the second bounding box (e.g., bounding box 804) satisfy the distance threshold (e.g., gap between the bounding boxes 802 and 804 is less than or equal to the threshold), assigning (e.g., using the grouping component 116) the first bounding box 802 and the second bounding box 804 to a bounding box group (e.g., bounding box group 808), wherein the bounding box group replaces the first bounding box and the second bounding box, and wherein the bounding box group comprises the first text and second text of the second bounding box. In this regard, the first bounding box 802 and the second bounding box 804 can be discarded, as the bounding box group (e.g., bounding box group 808) encompasses the text occupied in the first bounding box 802 and the second bounding box 804. At 512, the process 500 can comprise determining (e.g., using the context component 118) context information associated with the document (e.g., document 800). Such context information can comprise a variety of context information as previous discussed, and can be based on one or more context identifiers, also previously discussed.

At 514, the process 500 can comprise adjusting the distance threshold (e.g., using the adjustment component 120) based on the context information, using a tuning model, wherein the tuning model has been generated based on machine learning (e.g., using the ML component 122) applied to past context information representative of past contexts of other text in other documents other than the document. As previously discussed, the tuning model can be employed in order to optimize bounding box distance thresholds, which can ultimately improve accuracies of merged text bounding boxes. According to an example, various contexts can be associated or correlated with various documents and/or distance thresholds. In this regard, an identified IRS logo (e.g., at logo 812 or object 810) can indicate that a document is an IRS tax document. IRS tax documents can comprise one or more distance thresholds. Thus, in response to identification of the IRS logo, a distance threshold determined to be associated with the logo can be applied (e.g., a default or defined distance threshold can be adjusted based on the identification of the logo).

Figure 6:
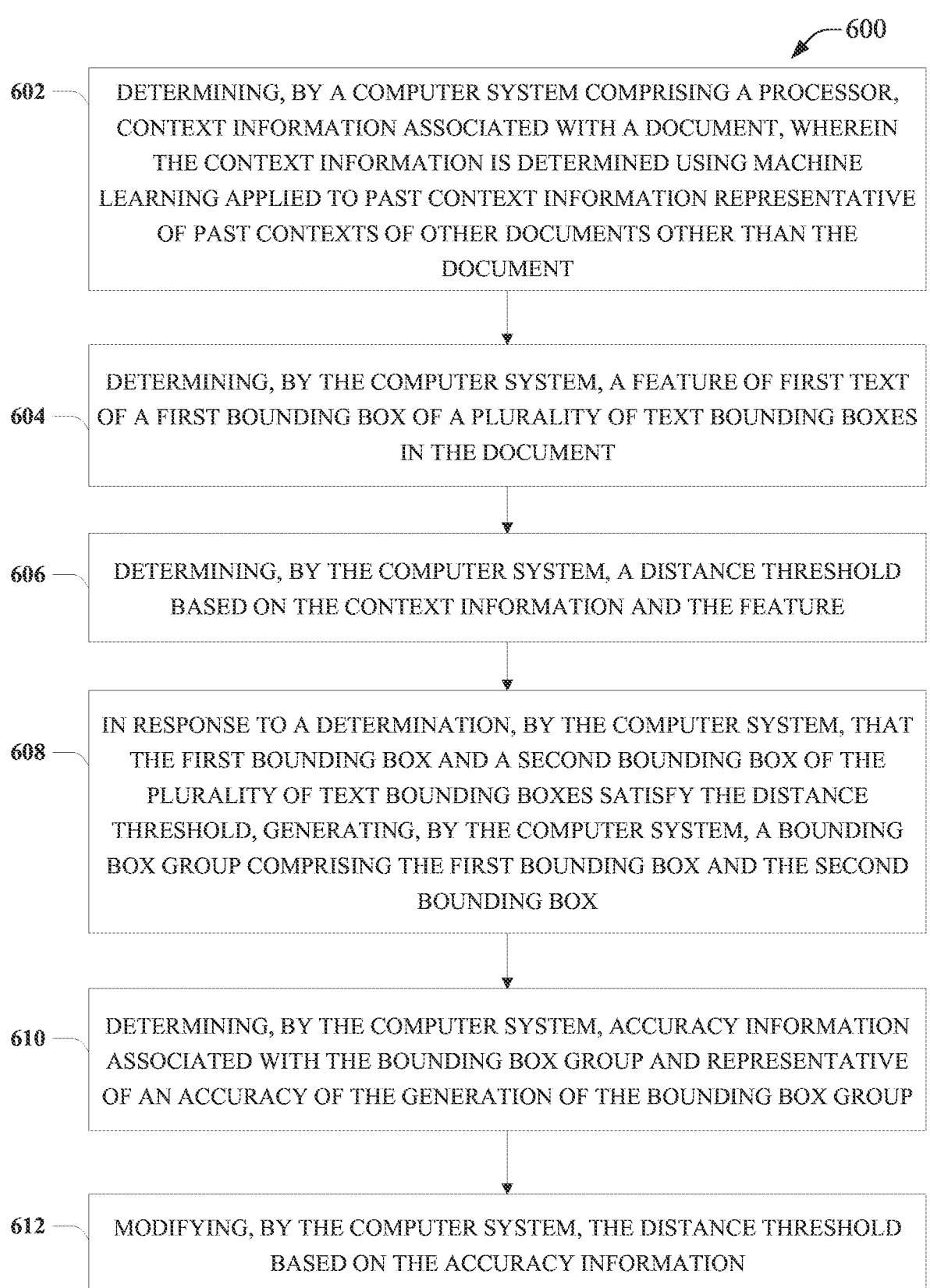
FIG. 6 is a block flow diagram for a process for bounding box merging in accordance with one or more embodiments described herein.

FIG. 6 illustrates a block flow diagram for a process 600 for bounding box merging in accordance with one or more embodiments described herein. At 602, the process 600 can comprise determining, by a computer system comprising a processor (e.g., using the context component 118), context information associated with a document (e.g., document 800), wherein the context information is determined using machine learning (e.g., using the ML component 122) applied to past context information representative of past contexts of other documents other than the document. In this regard, and as previously discussed, such context information can be based on one or more context identifiers. If presently identified context information correlates (e.g., satisfies a threshold level of correlation) with previously identified context information in a different document, one or more distance thresholds associated with the previously document can be utilized in a determination of a bounding box threshold in the present document (e.g., document 800). At 604, the process 600 can comprise determining, by the computer system (e.g., using the characteristic component 112), a feature (e.g., a characteristic) of first text of a first bounding box (e.g., bounding box 802) of a plurality of text bounding boxes (e.g., bounding boxes 802-806) in the document (e.g., document 800).

At 606, the process 600 can comprise determining, by the computer system (e.g., using the threshold component 114), a distance threshold based on the context information and the feature (e.g., a font size). In this regard, the context information and feature can be evaluated, and can be respectively weighted (e.g., using machine learning or a neural network herein), in order to determine the distance threshold. As previously discussed, weights can be associated with respective relative importance (e.g., of such context information and/or features). At 608, the process 600 can comprise, in response to a determination, by the computer system, that the first bounding box (e.g., bounding box 802) and a second bounding box (e.g., bounding box 804) of the plurality of text bounding boxes (e.g., bounding boxes 802-806) satisfy the distance threshold, generating, by the computer system (e.g., via the grouping component 116), a bounding box group (e.g., bounding box group 808) comprising the first bounding box (e.g., bounding box 802) and the second bounding box (e.g., bounding box 804). In this regard, the first bounding box 802 and the second bounding box 804 can be deleted, and the contents of each can be incorporated into the singular bounding box group 808.

At 610, the process 600 can comprise determining, by the computer system (e.g., using the accuracy component 126), accuracy information associated with the bounding box group and representative of an accuracy of the generation of the bounding box group. In this regard, a neural network can be employed in order to determine such accuracy information, which can be utilized in order to modify the distance threshold based on historical accuracies associated with various historical distance thresholds. At 612, the process 600 can comprise modifying, by the computer system (e.g., using the adjustment component 120), the distance threshold based on the accuracy information, resulting in an optimized distance threshold employable for bounding box merging herein.

Figure 7:
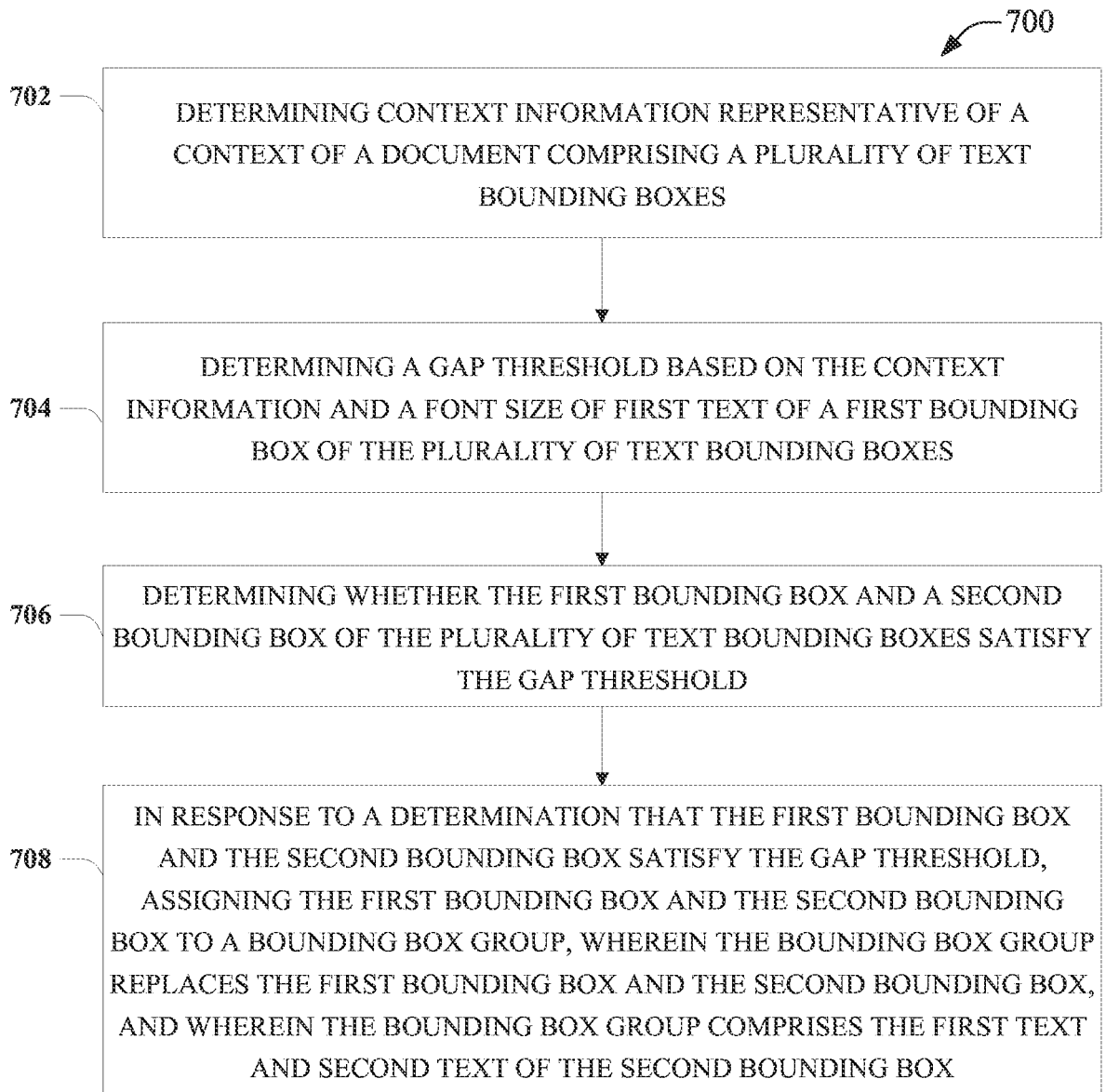
FIG. 7 is a block flow diagram for a process for bounding box merging in accordance with one or more embodiments described herein.

FIG. 7 illustrates a block flow diagram for a process 700 for bounding box merging in accordance with one or more embodiments described herein. At 702, the process 700 can comprise determining (e.g., using the context component 118) context information representative of a context of a document (e.g., document 800) comprising a plurality of text bounding boxes (e.g., bounding boxes 802-806). In this regard, such context information can be determined using one or more context identifiers. At 704, the process 700 can comprise determining (e.g., using a threshold component 114) a gap threshold based on the context information and a font size of first text of a first bounding box (e.g., bounding box 802) of the plurality of text bounding boxes. In this regard, a tuning model, as previously discussed, can be employed to adjust a gap threshold (e.g., an initial or default gap threshold) based on the context information and the font size (e.g., a feature or characteristic of the text). At 706, the process 700 can comprise determining (e.g., using the threshold component 114) whether the first bounding box and a second bounding box of the plurality of text bounding boxes satisfy the gap threshold. This determination can occur by comparing a distance between edges of adjacent bounding boxes (e.g., bounding boxes 802 and 804) to the gap threshold to determine whether the gap is less than or equal to the gap threshold. At 708, the process 700 can comprise in response to a determination that the first bounding box and the second bounding box satisfy the gap threshold, assigning (e.g., using the grouping component 116) the first bounding box (e.g., bounding box 802) and the second bounding box (bounding box 804) to a bounding box group (e.g., bounding box group 808), wherein the bounding box group replaces the first bounding box and the second bounding box, and wherein the bounding box group comprises the first text and second text of the second bounding box.

FIG. 8 illustrates an exemplary document 800 (as discussed above) in accordance with one or more embodiments described herein. Though document 800 depicts a shipping label, this is purely exemplary, and other types of documents 800 can be utilized herein (e.g., tax documents, banking documents, journal entries, notes, postcards, business cards, letters, legal documents, stamps, signs, flyers, advertisements, bills, or any other document that can be subject to OCR. According to an embodiment, the document 800 can comprise bounding box 802, bounding box 804, and bounding box 806. According to an example, the bounding box 802 can comprise a first bounding box, the bounding box 804 can comprise a second bounding box, and the bounding box 806 can comprise a third bounding box. In this regard, bounding box group 808 can comprise a grouping of the bounding boxes 802-806. In this example, the bounding box group 808 can be determined to be representative of a tracking number of a shipping label. According to an embodiment, the object 810 and/or logo 812 can represent an insignia described herein. In this regard, the object 810 or logo 812 can indicate that the document 800 comprises a shipping label, which can be utilized to adjust a distance threshold associated with the bounding boxes 802-806 and the bounding box group 808.

Figure 9:
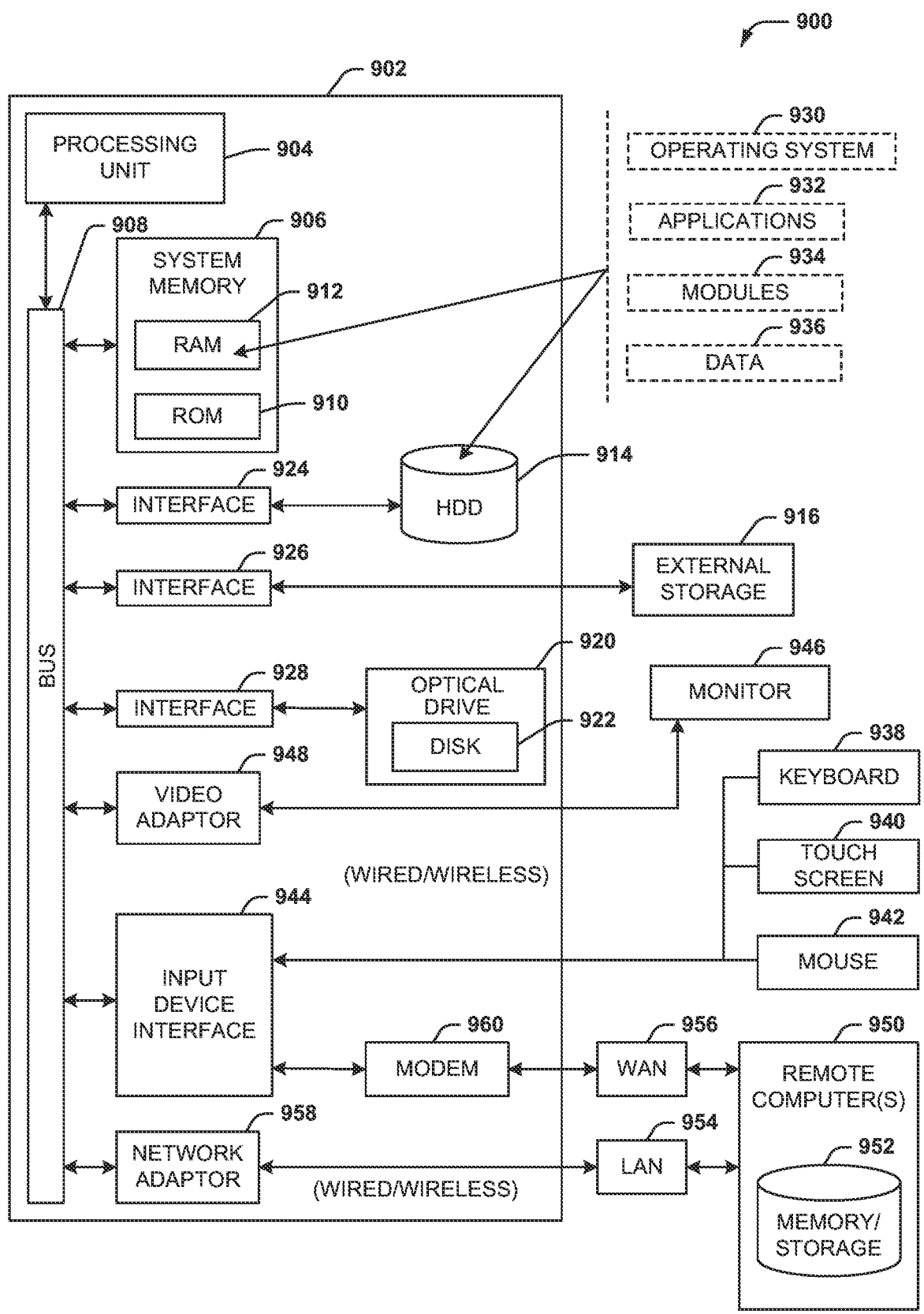
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
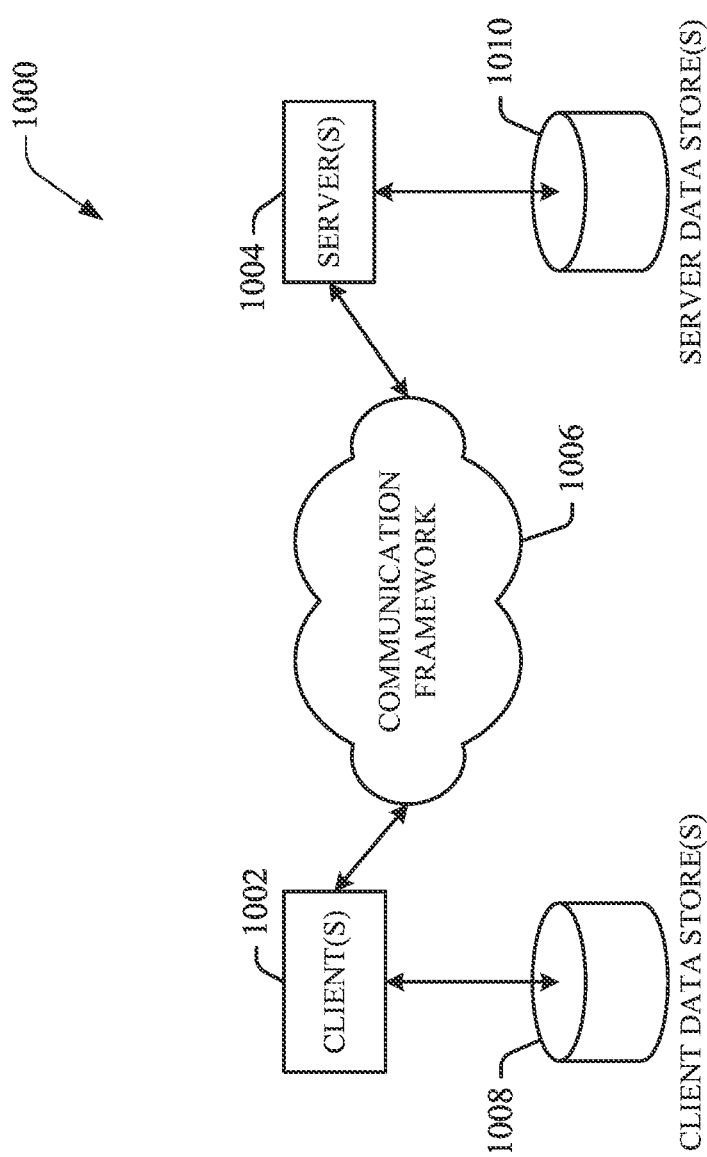
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a non-transitory computer-readable medium having stored thereon computer-executable instructions that are executable by the system to cause the system to perform operations comprising:
accessing a document comprising a plurality of text bounding boxes;
determining a characteristic of first text of a first bounding box of the plurality of text bounding boxes;
determining a distance threshold based on the characteristic of the first text of the first bounding box;
determining whether the first bounding box and a second bounding box of the plurality of text bounding boxes satisfy the distance threshold;
in response to a determination that the first bounding box and the second bounding box satisfy the distance threshold, assigning the first bounding box and the second bounding box to a bounding box group, wherein the bounding box group replaces the first bounding box and the second bounding box, and wherein the bounding box group comprises the first text and second text of the second bounding box;

determining context information associated with the document; and adjusting the distance threshold based on the context information, using a tuning model, wherein the tuning model has been generated based on machine learning applied to past context information representative of past contexts of other text in other documents other than the document.

2. The system of claim 1, wherein the operations further comprise:

determining whether the bounding box group and a third bounding box of the plurality of text bounding boxes satisfy the distance threshold; and in response to a determination that the bounding box group and the third bounding box satisfy the distance threshold, assigning third text of the third bounding box into the bounding box group, wherein the bounding box group replaces the third bounding box.

3. The system of claim 1, wherein the plurality of text bounding boxes comprise a row of text in the document, and wherein bounding boxes of the plurality of text bounding boxes are grouped according to distances between adjacent bounding boxes determined to be less than or equal to the distance threshold.

4. The system of claim 1, wherein at least one of the first text or the second text is identified using electronic optical character recognition.

5. The system of claim 1, wherein the context information comprises an entity associated with the document, and wherein the entity is associated with an insignia identified in the document.

6. The system of claim 1, wherein the context information comprises environmental information associated with capturing of the document.

7. The system of claim 1, wherein the context information comprises batching information associated with the document.

8. The system of claim 1, wherein the context information comprises a plurality of context identifiers, and wherein the plurality of context identifiers are weighted according to importance criteria determined using machine learning applied to past context identifier information representative of past contexts of the other documents.

9. The system of claim 1, wherein the characteristic comprises a font size of the first text.

10. A computer-implemented method, comprising:

determining, by a computer system comprising a processor, context information associated with a document, wherein the context information is determined using machine learning applied to past context information representative of past contexts of other documents other than the document;

determining, by the computer system, a feature of first text of a first bounding box of a plurality of text bounding boxes in the document;

determining, by the computer system, a distance threshold based on the context information and the feature;

in response to a determination, by the computer system, that the first bounding box and a second bounding box of the plurality of text bounding boxes satisfy the distance threshold, generating, by the computer system, a bounding box group comprising the first bounding box and the second bounding box;

determining, by the computer system, accuracy information associated with the bounding box group and representative of an accuracy of the generating of the bounding box group; and modifying, by the computer system, the distance threshold based on the accuracy information.

11. The computer-implemented method of claim 10, wherein the feature is a font size, and wherein the font size of the first text of the first bounding box is determined, by the computer system, based on a length, a width, and a height of the first bounding box.

12. The computer-implemented method of claim 10, wherein the distance threshold comprises a horizontal distance threshold, and wherein the computer-implemented method further comprises:

determining, by the computer system, whether the bounding box group and a third bounding box of the plurality of text bounding boxes satisfy a vertical distance threshold; and in response to a determination, by the computer system, that the bounding box group and the third bounding box satisfy the vertical distance threshold, assigning, by the computer system, the third bounding box to the bounding box group, wherein the bounding box group comprises the first text, second text of the second bounding box, and third text of the third bounding box.

13. The computer-implemented method of claim 12, wherein the plurality of text bounding boxes comprise text in the document, and wherein bounding boxes of the plurality of text bounding boxes are grouped, by the computer system, according to distances between adjacent bounding boxes determined, by the computer system, to be less than or equal to at least one of the horizontal distance threshold or the vertical distance threshold.

14. The computer-implemented method of claim 13, wherein bounding boxes of the plurality of text bounding boxes are grouped, by the computer system, according to distances between the adjacent bounding boxes determined, by the computer system, to be less than or equal to both of at the horizontal distance threshold and the vertical distance threshold.

15. The computer-implemented method of claim 10, further comprising:

determining, by the computer system, graphing information comprising relative position information associated with the plurality of text bounding boxes, wherein the context information is further determined, by the computer system, using a neural network based on the graphing information.

16. The computer-implemented method of claim 15, wherein the distance threshold comprises a dynamic distance threshold adjusted, by the computer system, using the neural network and based on the context information.

17. A computer-program product for facilitating bounding box merging, the computer-program product comprising a non-transitory computer-readable medium having program instructions embedded therewith, the program instructions executable by a computer system to cause the computer system to perform operations comprising:

determining context information representative of a context of a document comprising a plurality of text bounding boxes;

determining a gap threshold based on the context information and a font size of first text of a first bounding box of the plurality of text bounding boxes;

determining whether the first bounding box and a second bounding box of the plurality of text bounding boxes satisfy the gap threshold; and in response to a determination that the first bounding box and the second bounding box satisfy the gap threshold, assigning the first bounding box and the second bounding box to a bounding box group, wherein the bounding box group replaces the first bounding box and the second bounding box, and wherein the bounding box group comprises the first text and second text of the second bounding box.

18. The computer-program product of claim 17, wherein the font size is a first font size, and wherein the operations further comprise:
in response to assigning the first bounding box and the second bounding box to the bounding box group, updating the gap threshold to a minimum of:
the first font size of the first text of the first bounding box, and
a second font size of the second text of the second bounding box.

19. The computer-program product of claim 17, wherein the gap threshold is further based on a logo identified in the document.

20. The computer-program product of claim 17, wherein the operations further comprise:
receiving accuracy information representative of grouping accuracies associated with the bounding box group; and
in response to receiving the accuracy information, modifying the gap threshold based on the accuracy information.

* * * * *